(12) United States Patent
Mangal et al.

(10) Patent No.: US 8,276,197 B1
(45) Date of Patent: Sep. 25, 2012

(54) CASCADING NETWORK LOGIN

(75) Inventors: Manish Mangal, Overland Park, KS (US); Jeremy R. Breau, Kansas City, MO (US); Frederick C. Rogers, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 908 days.

(21) Appl. No.: 11/734,581

(22) Filed: Apr. 12, 2007

Related U.S. Application Data

(60) Provisional application No. 60/853,306, filed on Sep. 29, 2006, provisional application No. 60/853,307, filed on Sep. 29, 2006, provisional application No. 60/864,340, filed on Nov. 3, 2006.

(51) Int. Cl.
*H04L 29/06* (2006.01)
(52) U.S. Cl. ............................................... 726/8
(58) Field of Classification Search .................. 726/8, 5, 726/3
See application file for complete search history.

(56) References Cited

U.S. PATENT DOCUMENTS

| | | | |
|---|---|---|---|
| 6,785,256 B2 | 8/2004 | O'Neil | |
| 6,988,146 B1 | 1/2006 | Magret et al. | |
| 7,130,629 B1 | 10/2006 | Leung et al. | |
| 7,292,592 B2 | 11/2007 | Rune | |
| 7,356,137 B1 | 4/2008 | Burg et al. | |
| 7,551,926 B2 | 6/2009 | Rune | |
| 7,561,579 B2 | 7/2009 | Madour et al. | |
| 7,730,524 B2 | 6/2010 | Patel et al. | |
| 7,881,288 B2 | 2/2011 | Noldus et al. | |
| 2002/0110104 A1* | 8/2002 | Surdila et al. | 370/338 |
| 2003/0026245 A1* | 2/2003 | Ejzak | 370/352 |
| 2003/0133421 A1* | 7/2003 | Sundar et al. | 370/328 |
| 2003/0229787 A1* | 12/2003 | Gabor | 713/168 |
| 2004/0225895 A1 | 11/2004 | Mukherjee et al. | |
| 2005/0009520 A1 | 1/2005 | Herrero et al. | |
| 2005/0210261 A1* | 9/2005 | Kamperman et al. | 713/182 |
| 2006/0005185 A1* | 1/2006 | Nguyen | 718/1 |
| 2006/0077924 A1 | 4/2006 | Rune | |
| 2006/0077926 A1 | 4/2006 | Rune | |
| 2006/0120287 A1* | 6/2006 | Foti et al. | 370/231 |
| 2006/0123469 A1 | 6/2006 | Lee et al. | |
| 2006/0143703 A1 | 6/2006 | Hopen et al. | |
| 2006/0156390 A1* | 7/2006 | Baugher | 726/5 |
| 2006/0279628 A1 | 12/2006 | Fleming | |
| 2007/0022200 A1 | 1/2007 | Benkert et al. | |
| 2007/0053361 A1* | 3/2007 | Chen et al. | 370/392 |
| 2007/0060097 A1 | 3/2007 | Edge et al. | |
| 2007/0072605 A1* | 3/2007 | Poczo | 455/432.2 |
| 2007/0094691 A1 | 4/2007 | Gazdzinski et al. | |

(Continued)

OTHER PUBLICATIONS

Non-Final Office Action; mailed Apr. 1, 2010; U.S. Appl. No. 11/734,568, filed Apr. 12, 2007; First Named Inventor: Manish Mangal; Confirmation No. 1288.

(Continued)

*Primary Examiner* — David Pearson

(57) ABSTRACT

A method and system are provided for accessing network resources. An embodiment of the method includes receiving login information associated with logging one or more customers in to a data network associated with a first domain substantially owned by a first entity; and utilizing the login information to automatically register the one or more customers with a second data network associated with a second domain so that at least a portion of services that would have been available to a customer who was properly logged in to the second network will be available to the one or more customers by virtue of the registering.

15 Claims, 6 Drawing Sheets

U.S. PATENT DOCUMENTS

| | | | |
|---|---|---|---|
| 2007/0130471 A1* | 6/2007 | Walker Pina et al. | 713/182 |
| 2007/0180505 A1 | 8/2007 | Patel et al. | |
| 2007/0207805 A1* | 9/2007 | Pallares Lopez et al. | 455/436 |
| 2008/0090513 A1 | 4/2008 | Collins et al. | |
| 2008/0232352 A1 | 9/2008 | Terrill et al. | |
| 2009/0129386 A1 | 5/2009 | Rune | |

OTHER PUBLICATIONS

Final Office Action; mailed Mar. 31, 2010; U.S. Appl. No. 11/734,578, filed Apr. 12, 2007; First Named Inventor: Manish Mangal; Confirmation No. 1306.

Non-Final Office Action; mailed Oct. 5, 2009; U.S. Appl. No. 11/734,578; 16 pages.

Non-Final Office Action; mailed Oct. 5, 2009; U.S. Appl. No. 11/734,568; 17 pages.

Non-final Office Action; mailed Jun. 9, 2010; U.S. Appl. No. 11/734,575.

NFOA_Mail_Date_Oct. 5, 2010_U.S. Appl. No. 11/734,568, filed Apr. 12, 2007.

Notice of Allowance and Fee(s) Due, U.S. Appl. No. 11/734,570, Date Mailed: Aug. 4, 2011.

Final OA mailed Mar. 21, 2011, U.S. Appl. No. 11/734,568.

Final OA mailed May 12, 2011, U.S. Appl. No. 11/734,570.

Notice of Allowance and Fee(s) Due, U.S. Appl. No. 11/734,575, filed Apr. 12, 2007, Date Mailed: Nov. 26, 2010.

Non-final Office Action; mailed Aug. 3, 2010 U.S. Appl. No. 11/734,570.

* cited by examiner

CASCADING NETWORK LOGIN

CROSS-REFERENCE TO RELATED APPLICATIONS

This application claims the benefit of three U.S. Provisional Applications (all of which are incorporated by reference herein): 1) Application No. 60/864,340 filed Nov. 3, 2006; 2) Application No. 60/853,307 having a filing date of Sep. 29, 2006, entitled "CASCADING NETWORK LOGIN"; and 3) Application No. 60/853,306 also having a filing date of Sep. 29, 2006, entitled "MULTIDOMAIN, INTERCARRIER, NETWORK-TO-NETWORK INTERFACE".

Moreover, Applicants wish to call the Office's attention to the fact that the five following Applications (one of which is this one), filed on even date herewith, include related disclosed subject matter: 1) "DYNAMIC CSCF ASSIGNMENT" Ser. No. 11/734,568; 2) "NAI (NETWORK ACCESS IDENTIFIER) EMBEDDING" Ser. No. 11/734,570; 3) "EXTRACTING EMBEDDED NAIS (NETWORK ACCESS IDENTIFIERS)" Ser. No. 11/734,575; 4) "MULTIDOMAIN, INTERCARRIER, NETWORK-TO-NETWORK INTERFACE" Ser. No. 11/734,578; and 5) "CASCADING NETWORK LOGIN" Ser. No. 11/734,581. The subject matter of each of these documents is expressly incorporated by reference herein.

BACKGROUND

In the past, data providers of a first domain have maintained a high degree of separation from data providers of a second domain. Consider two illustrative examples: the "cable domain" and the "wireless domain." Services in the "cable domain" are services provided by an entity who principally owns or controls a cable TV (CATV) infrastructure. Illustrative services include television programming (including satellite, on-demand etc.), a form of high-speed Internet access, and a variety of other services. Providers in the "wireless domain" principally own or operate a large-scale wireless-communications network. Illustrative services include mobile-phone communications, messaging (text, MMS etc.), other forms of Internet access, and more. Historically, there has been no need to consider resource sharing between those in the wireless domain and those in the cable domain because the respective services were sufficiently distinct, and respective endpoints took on very different forms. For example, a cable box of the 1980s bore little in common with a cell phone of that time frame. But times are changing.

Today's and future smart phones, powerful PDAs, and other hybrid electronic devices will be able to do things that past dedicated devices could not. For instance, a mobile-phone presents a version of television on its small display as long as the service is being provided by the same carrier that provides voice service. Similarly, a cable company's infrastructure can be used by a cable company to offer telephone service, (e.g., via VoIP and a phone adapter) but again, as long as the cable company uses its resources to all the services to work.

The current state of the art could be improved by providing a framework in the form of one or more network-to-network interfaces that would allow the services of a first carrier or in a first domain to be able to be used along with those of a second carrier or entity in a second domain.

SUMMARY

The presenting invention is defined by the claims below. Embodiments of the present invention solve at least the above problems by providing a system and method for, among other things, sharing infrastructure resources across networks in different domains. The present invention has several practical applications in the technical arts including allowing a customer of a company in a first domain to be able to utilize the services of another (of the same) company in another domain.

In a first illustrative aspect, a computer program product for facilitating a method of accessing network resources is provided. The method includes receiving login information associated with logging one or more customers in to a data network associated with a first domain substantially owned by a first entity, utilizing the login information, automatically registering the one or more customers with a second data network associated with a second domain so that at least a portion of services that would have been available to a customer who was properly logged in to the second network will be available to the one or more customers by virtue of the registering.

In a second aspect, a method of providing a user access to network resources in an IP Multimedia Subsystem (IMS) networking environment is provided. The method includes receiving by way of a first network a request from a user of a desire to access a set of services, determining that to satisfy the request, at least a portion of the services will need to be provided by a second network owned by another entity, and utilizing login credentials associated with the first network to replicate a login process associated with the second network so that the set of services can be provided to the user without user intervention.

In a final illustrative aspect, a computer program product for performing a method of allowing resources associated with a second network to be provided to a customer via a first network is provided. The method includes providing access to a first network that includes at least in part an IP Multimedia Subsystem (IMS) architecture, receiving via a first network an indication that indicates a user wishes to access at least a portion of a set of services that will require accessing the second network, which also includes at least in part an IP Multimedia Subsystem (IMS) architecture, utilizing one or more resources associated with the first network to determine identifying information associated with the user, and utilizing the identifying information to interface with the second network such that the set of services may be provided to the customer.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
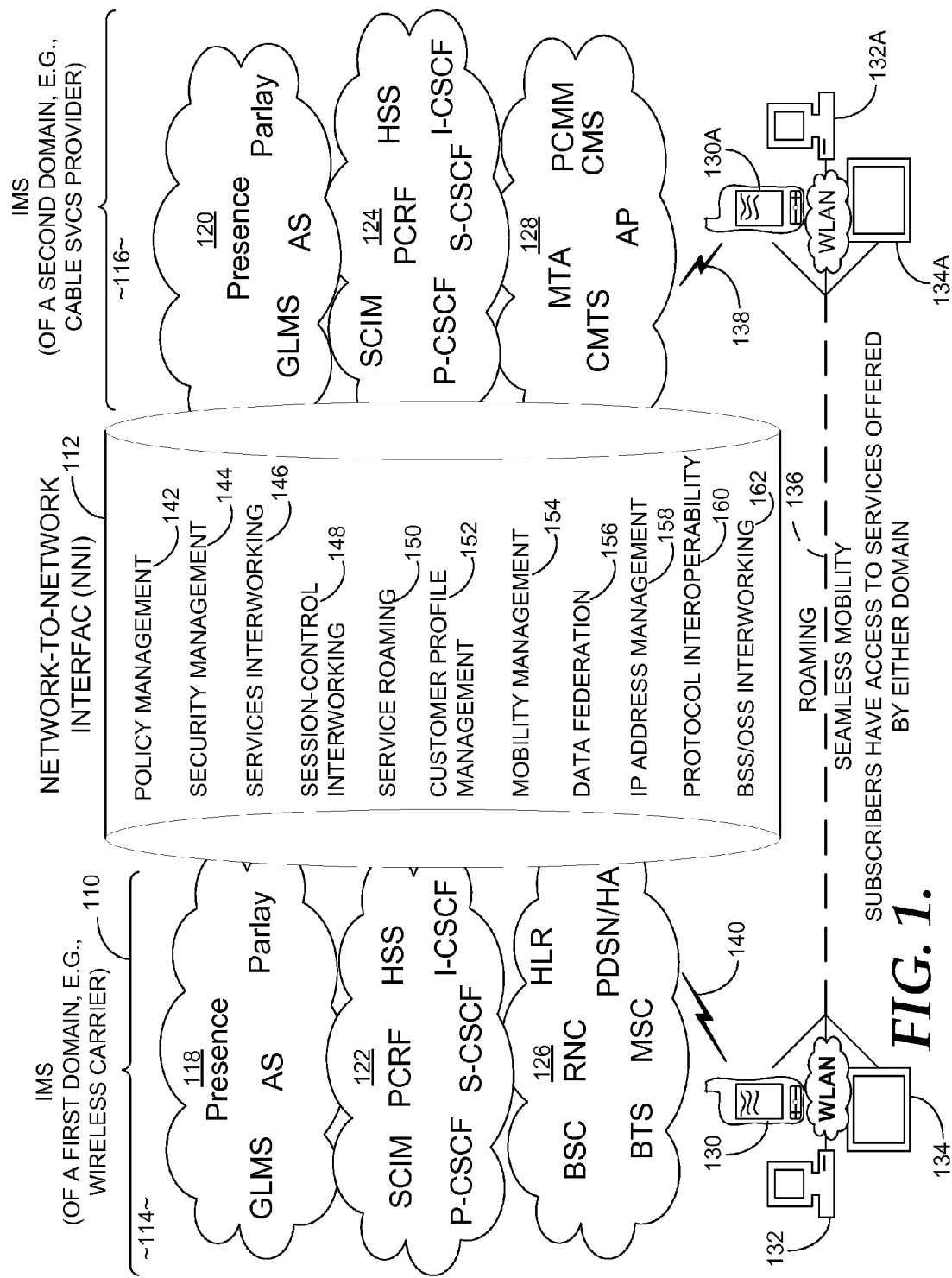
FIG. 1 is a block diagram depicting an illustrative operating environment suitable for practicing an embodiment of the present invention.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AP | Application Protocol |
| AS | Application Server |
| BSC | Base Station Controller |
| BSS | Business Support Systems (or Services) |
| BTS | Base Transceiver Station |
| CATV | Cable TV |
| CDMA | Code Division Multiple Access |
| CD-ROM | Compact Disk Read Only Memory |
| CMS | Call Management Server |
| CMTS | Cable Modem Termination System |
| CSCF | Call Session Control Function |
| DHCP | Dynamic Host Configuration Protocol |
| DVD | Digital Versatile Discs |
| EEPROM | Electrically Erasable Programmable Read Only Memory |
| GLMS | Group List Management Server |
| GSM | Global System for Mobile Communications |
| GPRS | General Packet Radio Service |
| HLR | Home Location Register |
| HSS | Home Subscriber Server |
| I-CSCF | Interrogating Call Session Control Function |
| IMS | IP Multimedia Subsystem |
| IPR | IP Rights |
| LAN | Local Access Network |
| MMS | Multimedia Messaging Service |
| MSC | Mobile Switching Center |
| MTA | Message Transfer Architecture |
| NNI | Network-Node Interface |
| OSS | Operational Support Systems (or Services) |
| PCMM | Packet Cable Multi Media |
| PCRF | Policy and Charging Resource Function |
| P-CSCF | Proxy Call Session Control Function |
| PDA | Personal Digital Assistant |
| PDSN/HA | Packet Data Serving Node/Home Agent |
| P/I-CSCF | Proxy/Interrogating Call Session Control Function |
| RAM | Random Access Memory |
| RNC | Radio Network Controller |
| ROM | Read Only Memory |
| SCIM | Service Capability Interaction Manager |
| S-CSCF | Serving Call Session Control Function |
| SIP | Session Initiation Protocol |
| TDMA | Time Division Multiple Access |
| VCC | Voice Call Continuity |
| VoIP | Voice over Internet Packet |
| VOP | Voice Over Packet |

Further, various technical terms are used throughout this description. A definition of such terms can be found in *Newton's Telecom Dictionary* by H. Newton, $21^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

FIG. 1 depicts an illustrative environment 110 where services have the technical capability to be exhibit shared relationships with each other even though services are being provided by different (as opposed to the same) carriers. A converged services environment 110 allows services in either domain to be provided to a customer without the customer knowing that such services are being provided by different entities (or the same entities in different domains). In an illustrative example, a user watching a certain television channel, say PBS, may be in the middle of watching a show on the television but can now have that show sent to his or her mobile device (phone, PDA, etc.) to finish after they have left the living room (while taking a taxi cab to the airport for example).

In one embodiment, the architecture described herein leverages IMS, or IP Multimedia Subsystem technology, taking its principles further. An IP Multimedia Subsystem (IMS) network is a standardized architecture for telecom operators who want to provide mobile, fixed multimedia, and other services. It supports a Voice-over-Packet (VoP) implementation based on a 3GPP standardized implementation of SIP that can run over the standard Internet Protocol (IP). Existing phone systems (both packet-switched and circuit-switched) can be supported.

IMS uses open standard IP protocols, defined by the IETF (Internet Engineering Task Force). A multimedia session between two IMS users, between an IMS user and a user on the Internet, and between two users on the Internet is established using the same protocol. Moreover, the interfaces for service developers can also be based on IP protocols. This is why IMS can facilitate merging the Internet, CATV, cellular (mobile) communications, and more.

Although IMS allows some convergence of services (such as voice messaging and voice), it is constrained in that it can facilitate such services offered only by a single provider. Thus, a first carrier may use IMS to send television to a mobile phone using IMS only if that television stream is provided by said first carrier, which is a very different scenario than, say, said first carrier allowing a subscriber to watch television programming provided by a second carrier, which is what an embodiment of the present invention allows.

Thus, IMS has been defined as if all the services are residing in one environment under one ownership and to be delivered to endpoints associated with that environment. Mobile carriers control their mobile end points (handheld devices), but when the customer enters into the cable environment (his or her home for example), they lose control over that customer because digital phone and entertainment services are all provided by an entity in a different domain, such as a cable provider.

One applicable environment suitable for practicing an embodiment of the present invention includes that where each entity has their own IMS structure. An embodiment of the present invention allows the two networks to interwork so that services historically delivered only via their respective IMS infrastructures can be shared in a way that the services can be collectively and transparently delivered to customers.

In this way, an appropriately equipped handheld device can utilize wireless technologies (such as CDMA, TDMA, GPRS, GSM, etc.) when away from home or other localized areas, but use wireless LAN technologies when in the vicinity of a wireless LAN (e.g., airports, homes, bookstores, and wherever else a WiFi or similar connection can be utilized).

Returning to FIG. 1, a network-to-network interface (NNI) 112 exposes the resources of a first carrier in a first domain 114 with those of a second carrier in a second domain 116. Various clouds are shown that illustratively represent various services offered by each carrier. By way of example, cloud 118 includes technologies related to determining and utilizing presence information. Presence information relates to information associated with a geographic location or designated status of a person. One example includes emoticons (sometimes called "smiley faces") that indicate whether people are away from their computer, or sleeping, or otherwise unavailable. Presence information can also convey actual geographic location of users, via the location of their handheld devices. This is useful in providing location-based services and, in some scenarios, can be used to facilitate or help facilitate session hand off when one transitions from home to beyond.

Illustrative components that may be employed to provide presence information includes a Group List Management Server (GLMS), a Parlay or similar client (also know as a Parlay X Web service), or other Application Server (AS). Similar presence information is shown in cloud 120 associated with second domain 116.

Cloud 122 also depicts illustrative components that might be included, such as a Service Capability Interaction Manager (SCIM), a Policy and Charging Resource Function (PCRF), a Home Subscriber Server (HSS), a Proxy Call Session Control Function (P-CSCF), a Serving Call Session Control Function (S-CSCF), and an Interrogating Call Session Control Function (I-CSCF). These components are illustratively shown also in cloud 124, associated with second domain 116.

Cloud 126 depicts illustrative communications components including a Base Station Controller (BSC), a Radio Network Controller (RNC), a Home Location Register (HLR), a Base Transceiver Station (BTS), a Mobile Switching Center (MSC), and a Packet Data Serving Node/Home Agent (PDSN/HA).

In sister cloud 128, the following illustrative communications components are shown: a Cable Modem Termination System (CMTS), a Message Transfer Architecture (MTA), a Packet Cable Multi Media component (PCMM), and a Call Management Server (CMS). Of course there may actually be many instances of such components.

NNI 112 makes possible the sharing of network resources across networks to various devices, such as a mobile device (handheld, PDA, and the like) 130, a computer 132, and a television or equivalent 134. Roaming is thus possible, and can be done so seamlessly and transparent to a user, as indicated by line 136. Accordingly devices 130A, 132A, and 134A may be the same devices as 130, 132, and 134, but in a different location or operating using a different technology. For example, communications link 138 may be a wireless LAN link (e.g., one that comports with a variation of the 802.11 standard, such as 802.11a, 802.11b, 802.11g, 802.11n, or others), whereas communication link 140 may be a mobile wireless technology (e.g., CDMA, TDMA, GPRS, GSMC, etc.). This aspect is also explained in connection with FIG. 2 below.

NNI 112 may include various components that facilitate interoperability between the technologies of first domain 114 and those of second domain 116. Due to space consideration on the drawing, FIG. 1 includes only words inside of NNI 112, but it is to be understood that each title describes a component that facilitates an aspect of interoperability functionality. The illustrative components include a policy-management component 142, a security-management component 144, a services-interworking component 146, a session-control-interworking component 148, a service-roaming component 150, a customer-profile-management component 152, a mobility-management component 154, a data-federation component 156, an IP address management component 158, a protocol-interoperability component 160, and a BSS/OSS (Business Support Systems/Operational Support Systems) interworking component 162.

Some of the aforementioned components may be implemented in hardware, software, or a combination of the same. They may be composed of several constituent components. Moreover, others may attribute different names to the same components. Thus, descriptive adjectives have been provided that indicate the functions that these various components carry out. Additional explanations of the same follow.

Policy-management component 142 enables policies to be shared among two networks or more networks. Throughout this disclosure, explanation is generally provided with respect to two networks. But the same teachings described herein can be applied to environments with more than two networks so that the resources of as many networks as are desired can be shared. But so as to not obscure the present invention, references to two networks will be made, simplifying an explanation of but one embodiment of the present invention or an aspect thereof. Both IMS domains 114 and 116 include a policy-management architecture in one embodiment that would include a master-policy server and multiple distributed slave policy managers.

Accordingly, the policies applicable to a subscriber associated with a first domain, such as domain 114 can be commensurately effective in a second domain such as domain 116. The part of NNI 112 between the two network's master-policy managers may allow policy information about a customer to be shared between two networks in one embodiment. This sharing may include static as well as dynamic information. Static information may be shared at the time of user registration in one embodiment. Illustrative examples of static information include a user ID (in one embodiment, it could vary in others), services the user subscribes to, etc. Dynamic information may be shared at the time of service initiation in one embodiment. Illustrative examples of dynamic information include information that changes. This could include "cookie" type information but a better example may be presence information as services may change based on location. Dynamic information may also include things such as the flow type (VoIP=high QoS, Internet traffic=best effort, etc.). The user profile may over-write a dynamic parameter with a static value if the user profile changes (i.e., raises QoS to Gold level regardless of traffic flow type) a dynamic parameter to a predefined value.

Security-management 144 provides security interfaces between the networks so that the specific network topologies may be hidden from each other if desired. Although certain aspects or resources of each network may be desired to be shared as though the networks are one network, in the situations where, in fact, they are not one network, it may be desirable to keep other aspects of each network private.

Services-interworking component 146 allows services from multiple domains to be delivered to a customer irrespective of which domain they are connected to at any given point. It allows the available services to be published to a customer's device (e.g., one or more of 130, 132, or 134). In one embodiment, the serving IMS network has the responsibility to poll the other IMS domains to discover what services are available across all the IMS domains.

Session-control-interworking component 148 allows the serving network domain (where the user is at any given point) to control the sessions and services for the customer. This is an advance over the current state of the art, wherein current IMS architecture allows only the home network to control sessions and services.

Service-roaming component 150 facilitates cross-domain roaming. In this situation, a customer roams from one IMS domain (such as 114) to others (such as 116), triggering new registration to the other network as the case may be. The second network 116 then interacts with the home network 114 to gather customer information such as profile, policy, subscribed services, etc. Through the interfaces with other IMS domains, such services may be delivered.

Customer-profile-management component 152 manages sharing of information of customers' profiles across multiple networks. In one embodiment, customer-profile data may be stored as an HSS (Home Subscriber Server) network element (see reference numeral 214, FIG. 2 for example). When the customer is first provisioned, the subscriber information is provisioned in the HSS, such as 214. In the multidomain architecture according to an embodiment of the present invention, when the subscriber is provisioned in one operator's HSS 214, the interface between HSSs (e.g., between HSS 214 and HSS 216) allows that provisioning information to be passed along to other HSSs so that a subscriber is provisioned to multiple IMS networks at the same time. Depending on the amount of privacy desired, a roaming partner may not necessarily receive the entire user profile in some embodiments. But some portion of the profile (or domain) information may be shared in order to allow users to authenticate in visited domains as part of the roaming agreement is such is desired.

Seamless-mobility-management component 154 allows the user to move from one network to the other network while maintaining services without service interruption. Applicable technologies for such handoff and maintenance include voice, chat, messaging, video, and more. A Voice Call Continuity (VCC) server (not shown) can maintain call state when the user moves from one access network 114 to the other access network 116. To facilitate such continuity in a multi-domain environment, multiple VCC implementations (for example, one per each domain) can be employed in one embodiment. As the user moves from one domain 114 to the other domain 116, the visiting IMS network 116 would connect that session back to the originating IMS network 114 while the active call is ongoing. When the user enters an idle state (e.g., not in an active call), the client in the device would change the VCC server to the new IMS network 116.

Data federation component 156 facilitates operations associated with data federation, such as integrating diverse data in an enterprise or other environment. Other examples include resolving issues associated with transparency, heterogeneity, autonomy, and extensibility. Data federation component 156 allows intra-session inter-working of services and functions residing in multiple independent IMS infrastructures.

IP-address-management component 158 manages IP addresses across domains. In a multidomain environment, the IP address is assigned by the network that the user is connected to at any given point in one embodiment. As users move from one network 114 to another network 116, they may need to or it may be desirable to change their respective IP addresses. The IP address may be bound to several services that the customer is receiving. But changing an IP address could mean that the user would need to reregister with the network, causing a service interruption. IP-address-management component 158 helps communicate address-information change in a way that each network can still maintain a servicing state while the user changes networks until the user deregisters himself (e.g., by turning off the phone).

Protocol-interoperability component 160 translates data transmitted in protocol into that of another in instances where the networks in different domains communicate in disparate protocols in one embodiment. In another embodiment, a standard protocol is used, and all communications are translated according to that selected protocol.

BSS/OSS-interworking component 162 allows for the facilitation of business support services and operational support services.

Figure 2:
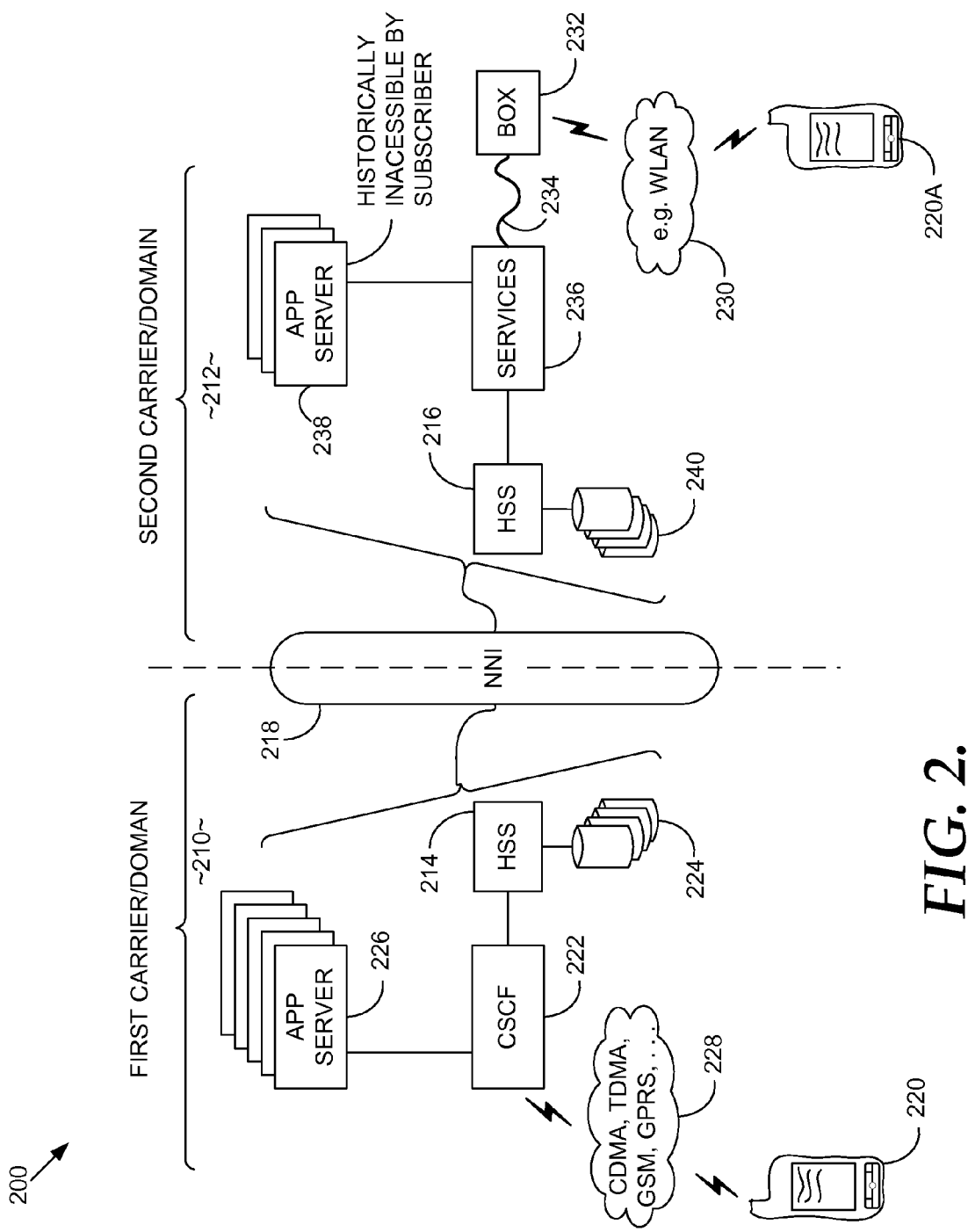
FIGS. 2 and 2A provide another depiction of an illustrative operating environment suitable for practicing an embodiment of the present invention.

Turning now to FIG. 2, another illustrative operating environment suitable for practicing an embodiment of the present invention is provided and referenced generally by the numeral 200. A first carrier or network of a first domain 210 is depicted along with a second currier or network in a second domain 212. Coupled together by a network-to-network interface (NNI) 218, which could be the same as NNI 112 of FIG. 1. First domain 210 may, for example, be a domain associated with a wireless carrier that provides wireless connectivity to such devices as a mobile phone, mobile email device, PDA, etc. (collectively and illustratively represented by device 220). A call session control function (CSCF) component is referenced by the numeral 222. It is coupled to a home subscriber's server (HSS) 214, which provides access to one or more databases 224 that store profile data associated with customers. Profile data stored in database 224 may relate to billing data, preference data, device-type data, and the like.

CSCF 222 is also coupled to one or more application servers 226. Application servers 226 may provide a variety of functions. For example, an illustrative application server may provide voice functionality. That is, the ability to have a voice telephone call between two (or more) entities. Another illustrative application that may be provided by an application server includes facilitating chat sessions. Other illustrative applications that could be provided include text messaging, multimedia messaging, videoconferencing, Internet access, and the like. In one embodiment, device 220 communicates with CSCF 222 via mobile wireless technologies, such as CDMA, TDMA, GSMC, GPRS and the like, illustratively represented by cloud 228.

In another setting, such as when device 220 enters second domain 212, (referenced by numeral 220A for clarity, it is contemplated to be the same device as 220), it communicates via a wireless technology such as a wireless LAN 230 with a box 232. Wireless LAN 230 may operate with a variety of protocols. Demonstrative protocols include variations of the 802.11 format, such as 802.11a, 802.11b, 802.11g, 802.11n, and the like. Box 232 is represented in generic fashion and may actually correspond to multiple constituent devices.

For example, box 232 may be a cable set-top box (or integrated circuitry) equipped with wireless-access-point functionality. Alternatively, box 232 may represent a wireless access point (such as a wireless router) coupled to a cable modem, which, through a portion of cable infrastructure (represented by numeral 234) is coupled to a services provider 236. Services provider, or services interface, 236 is also coupled to a variety of application servers referenced generally by the numeral 238. Historically, these services would have been inaccessible to subscribing device 220. But by virtue of NNI 218, they can be made available to device 220.

Various applications provided by an application server or variation thereof 238 include cable-television (or other content-type) delivery, voice over packet (VOP, e.g., VoIP) communications, and a variety of others. Services provider 238 is coupled to HSS 216 in domain 212, which exposes a set of profiles 240. Thus, in one embodiment, a customer of a cable provider, which may be in domain 212, may have a first profile as one of the profiles maintained in one or more databases 240. That same customer may have an account with a wireless carrier, and thus have profile data stored in one or more databases 224. But by virtue of NNI 218, mobile device 220 can communicate with the profiles stored in databases 240 to determine what type of services associated with second carrier 212 may be permissibly deliverable to device 220.

An HSS to HSS NNI may require strict policies and processes in one embodiment. Appropriate authorization for information to flow between domains will be provided, as explicit profile information may stay within the primary service domain in an embodiment. Users might request that profile information be shared between domains to enable new and/or unique services.

The type of services deliverable may turn on the type of device that 220 is, or the functionality it is capable of providing (such as video rendering, MMS capabilities, etc.) or it may turn on subscribing information. For example, if a person subscribes to a premium tier of cable TV offering, such as premium channels, then such content would be deliverable to device 220. But if the same customer subscribed only to basic cable, then content associated only with those channels may be streamed to device 220. In this way, seamless roaming between first carrier 210 and second carrier 212 would be facilitated by NNI 218.

If users are using a wireless LAN network 230 in their homes, and the cable modem connection for all their cable services, when they go outside the home, NNI 218 can facilitate data communication via CDMA or other mobile phone technology 228 so that the end device 220A continues to receive service uninterrupted. Device 220A becomes one common device for data services, but services can operate with other end devices such as a television and PC (as shown in FIG. 1). A customer would not even know nor need to know which technology is being utilized to effect the current service offering.

NNI 218 facilitates the sharing of information that is required to deliver services across these two environments 210 and 212 such that when a customer is in a certain location and requesting certain services, it can request anything in any domain that it has access to. These services can be managed as the customer moves around.

Figure 2A:
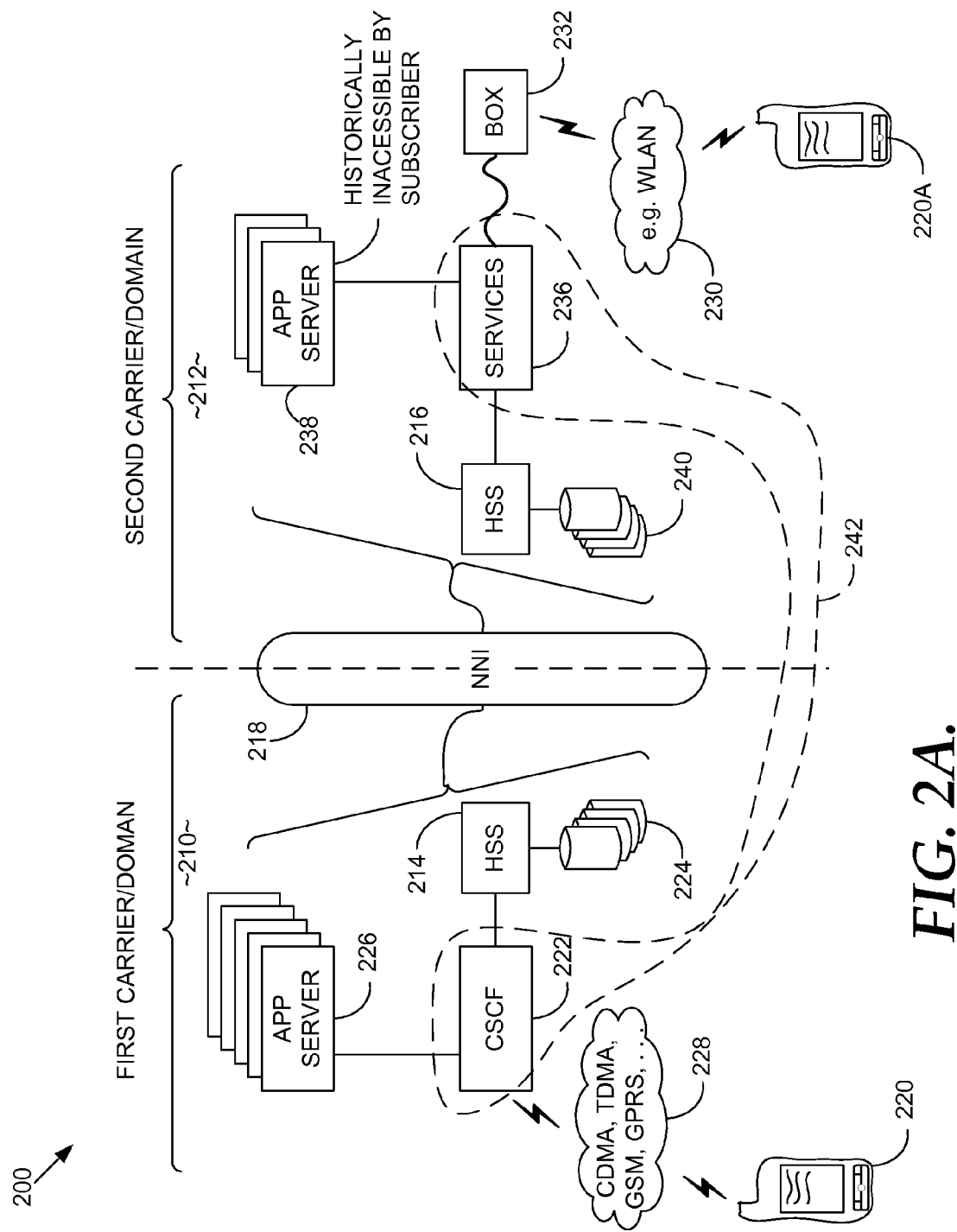

In this cross-domain environment, services from either one of the domains can be delivered anywhere. The architecture allows these two domains to exchange all the information that is necessary. To the customer, and to certain endpoints or other devices, rather than communicating with a respective CSCF 222 or its corresponding counterpart in second domain 212 (which could be another CSCF or equivalent, such as services component 236), both devices are seen as a common device, a situation graphically shown by dashed line 242 in FIG. 2A. Device 220 or 220A would not even know that it is requesting services of one domain versus another, just that it is requesting a certain type of service, and that request would be granted.

Cascading IMS Login

In one embodiment, this aspect of the invention provides a mechanism by which an owner of a first IMS system may allow IMS subscribers connecting though one IMS domain to access services on another (e.g., a remote) IMS domain without additional functionality needing to be added to subscriber equipment. This aspect relates to providing session-control interworking 148. When the subscriber is using connectivity provided by a first entity, the automated cascading IMS login process allows a local Serving-CSCF (S-CSCF) of the first entity to act as a proxy or Interrogating-CSCF/CI-CSCF. The S-CSCF uses information retrieved from the first entity's HSS to login to a second entity's IMS domain. In one embodiment, the session initiation protocol (SIP) is leveraged along with additional RADIUS/DIAMETER parameters. Among other things, this aspect of the invention facilitates the reaching of roaming user access to services on the IMS domain of both the original and roaming service provider's applications and services, thereby allowing simultaneous reachability of IMS services between multiple domains by subscribers.

Figure 3:
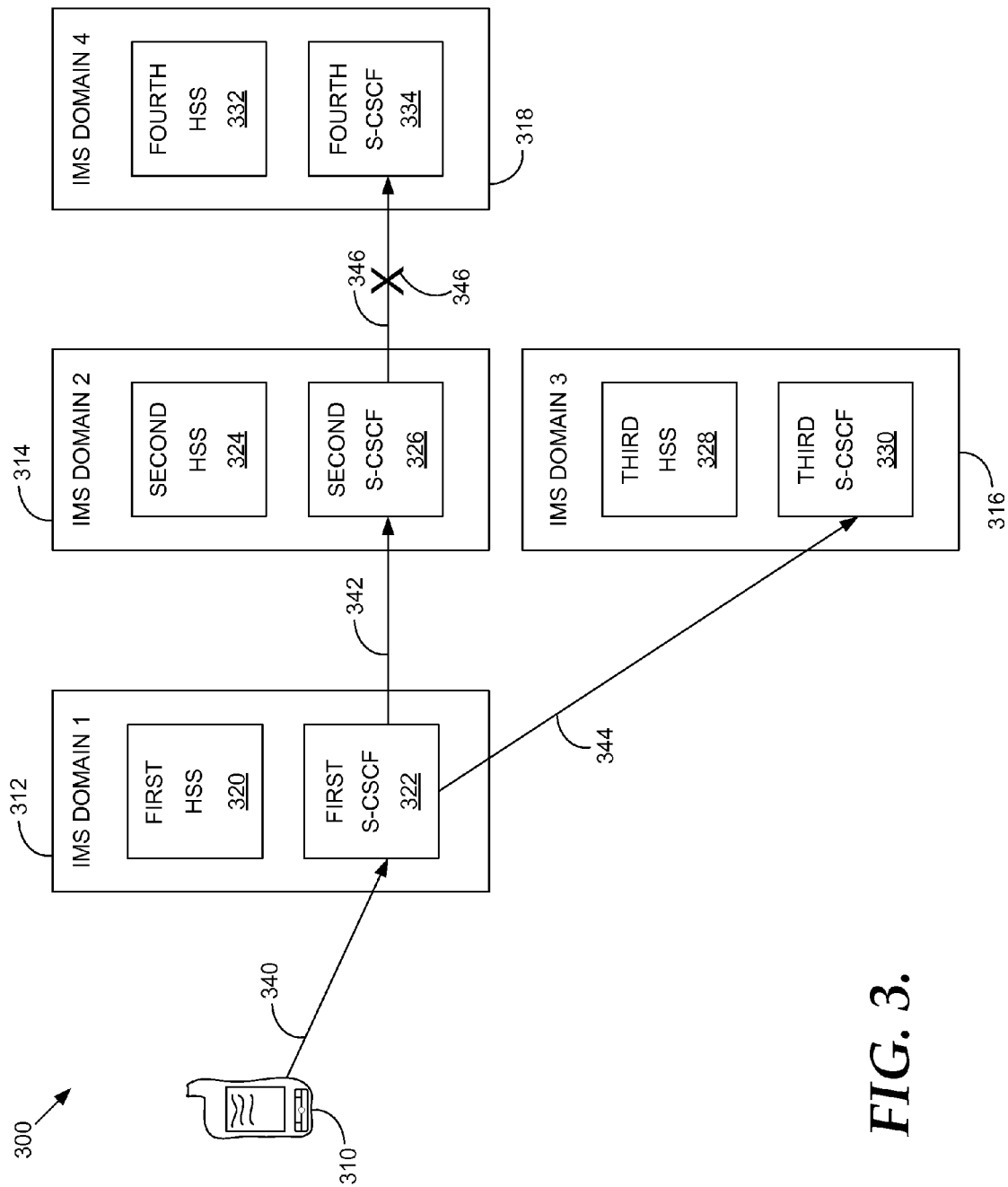
FIG. 3 is a combination block/process diagram depicting an illustrative embodiment for cascading a login process from one domain to other domains according to an embodiment of the present invention.

Turning now to FIG. 3, an illustrative method for allowing an IMS login to be automatically cascaded from a first domain to other domains according to an embodiment of the invention is provided and referenced generally by the numeral 300. To have a login automatically cascaded from a first domain to another or more domains means to substantially make it as though a user had logged into the second or more networks. That is, so that at least a portion (or even all) services that would be available to customers logged in to the second network will also be available to the customers who first logged into a first network, and had such login information utilized to register with the second network.

FIG. 3 depicts a handheld device 310 and also an IMS in a first domain 312, an IMS in a second domain 314, an IMS in a third domain 316, and an IMS in a fourth domain 318. Additional domains could be added of course, but those that are shown are for explanatory purposes and are illustrative in nature. Also shown in their respected domains are first HSS 320 and first S-CSCF 322 associated with first domain 312; second HSS 324 and second S-CSCF 326 associated with second domain 314; third HSS 328 and third S-CSCF 330 associated with third domain 316; and fourth HSS 332 and fourth S-CSCF 334 associated with fourth domain 318.

Out of step 340, handset 310 becomes aware of and starts to facilitate a first IMS registration with first S-CSCF 322 in first domain 312. First domain 312 in this example may be a person's wireless carrier for example. Out of step 342, first S-CSCF 322 in local domain 312 automatically cascades an IMS login to second S-CSCF 326 based on values returned from its local HSS 320.

An illustrative example is indicated by numeral 344, which illustratively shows that any additional IMS logins can be automatically cascaded to any number of domains. For example, first S-CSCF 322 also automatically cascades and facilitates the login process with third S-CSCF 330 in third domain 316 based on the values received from the local HSS 320 in first domain 312.

Though not required, it may be the case that logins may not be cascaded past one level. For example, out of step 346, suppose that S-CSCF 326 attempted to further cascade a login from first domain 312 onto fourth domain 318 by communicating with fourth S-CSCF 334. To the extent this is undesirable, an "X" denoted by reference numeral 346 illustrates that only the S-CSCF 322 in first domain 312 is allowed to perform cascading IMS login. But if such subsequent cascading login was desired, then the same could be allowed. With the IMS logins automatically cascaded down to second domain 314 and third domain 316, device 310 may now access the services associated with the HSS components in the respective domains. Device 310 may access services exposed by HSS 324 and second domain 314 as well as services exposed by HSS 328 and third domain 316. This can be used to share access to profile data stored in profile databases associated with the HSS components or be used to help facilitate services provided by one or more application servers via the respective CSCF in each domain.

Figure 4:
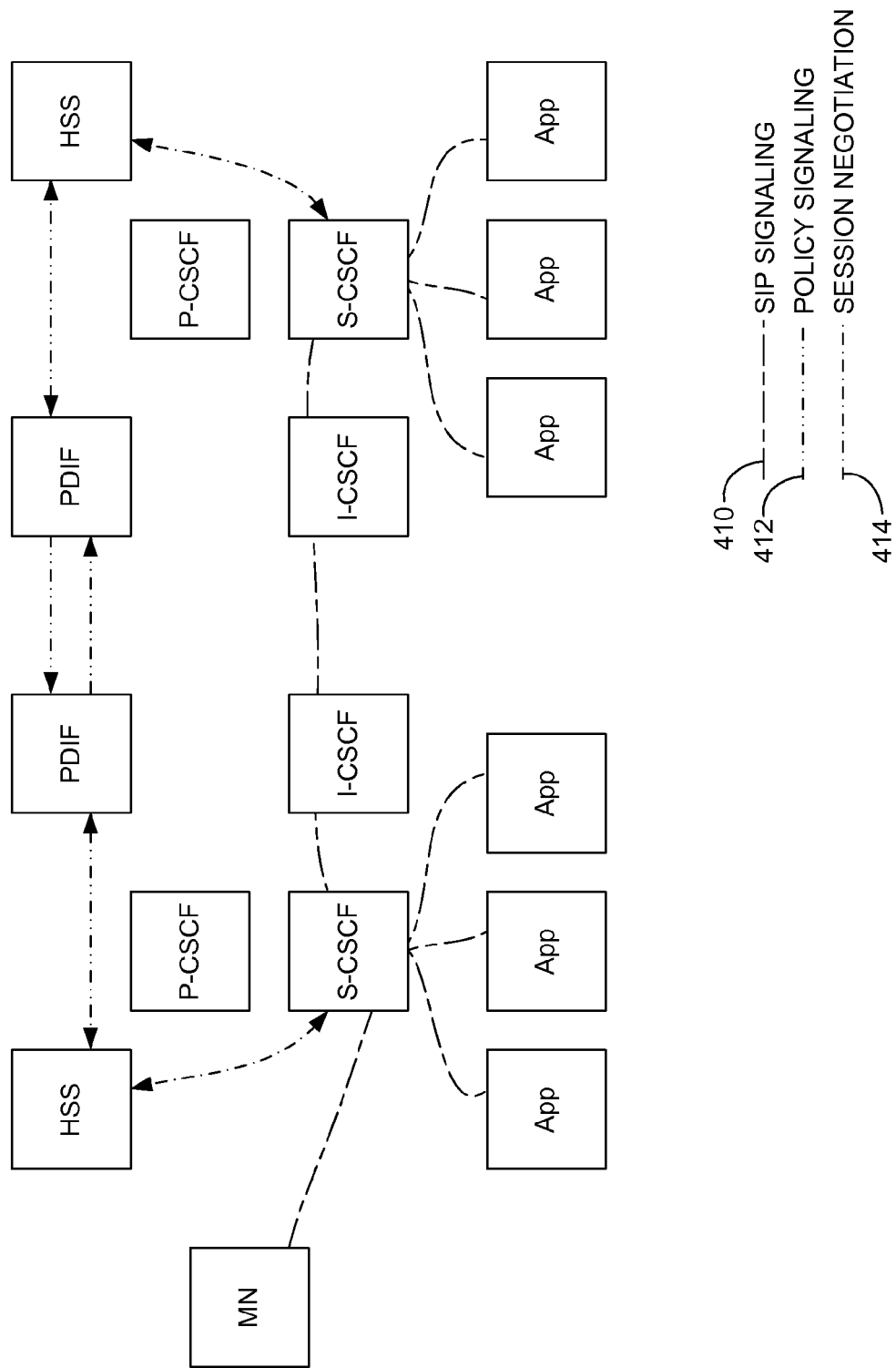
FIG. 4 depicts various illustrative signaling types used to communicate across various elements in connection with facilitating a cascading login process according to an embodiment of the present invention.

FIG. 4 depicts illustrative signaling in an environment where a home S-CSCF is acting as a P-CSCF to facilitate a single-login scenario. As shown, SIP signaling is depicted by a line having the style of that represented by reference numeral 410, policy signaling having format indicated by reference numeral 412, and session-negotiation signaling having a line type as indicated by reference numeral 414. FIG. 4, as with all FIGs, is incorporated by reference into the specification of this patent application and clearly indicates diagrammatically what would take many words to describe, but not necessarily explain in any clearer detail. Similarly, FIG. 4 illustrates but one example of an embodiment that utilizes various kinds of signaling types and/or protocols across various devices. Other types of signaling could be employed to communicate across the various devices shown in FIG. 4, as what is shown is done so to illustrate an aspect of the invention and provide one example of an embodiment that utilizes the various signaling types and protocols shown.

Figure 5:
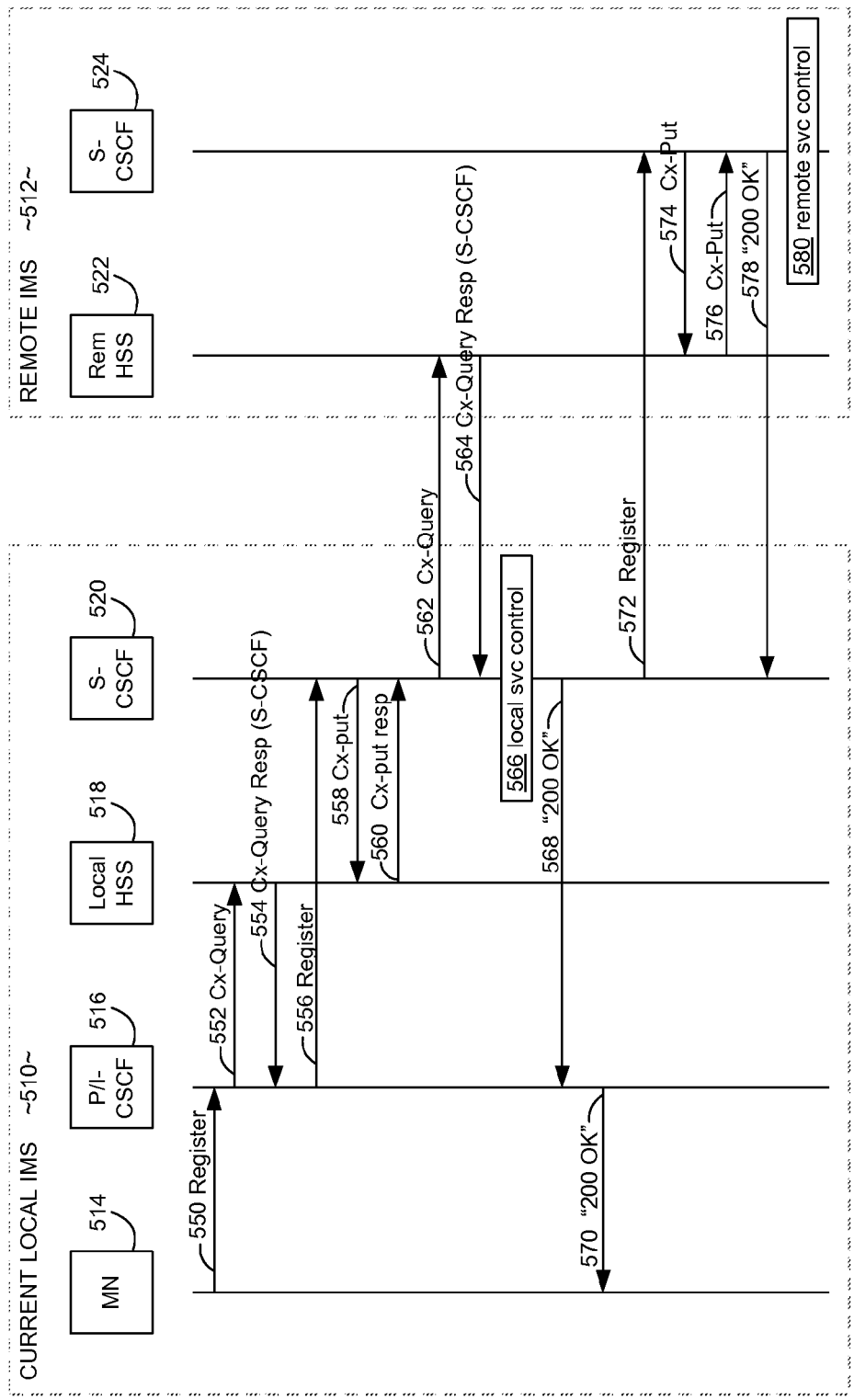
FIG. 5 is a call-flow diagram that depicts illustrative data exchanges that facilitate a cascading log-in process according to an embodiment of the present invention.

Turning now to FIG. 5, a call flow diagram represents illustrative exchanges of information between components in a local IMS 510 (first domain) and components in a remote IMS 512 (second domain). Exemplary devices associated with local IMS domain 510 include a mobile network 514, a P/I-CSCF 516, a local HSS, and an S-CSCF 520. Exemplary devices shown associated with remote IMS domain 512 include a remote HSS 522 and a remote S-CSCF 524.

At a step 550, a handset sends a SIP registration to local P/I-CSCF 516 that may be, for example, resolved through DHCP or other mechanisms. At a step 552, proxy and interrogating CSCF 516 queries for a local serving CSCF from local home subscriber service 518.

At a step 554, local Home Subscriber Server 518 assigns an S-CSCF for this user's session. At a step 556, P/I-CSCF 516 sends a SIP registration to local S-CSCF 520, which facilitates a Cx-put communication to local HSS 518 to obtain subscriber-specific information. S-CSCF 520 requests cascading IMS login information.

At a step 560, local HSS 518 responds with subscriber-session information as well as information supporting a cascading IMS login. Illustrative information supporting a cascading IMS login includes identifying indicia associated with the destination HSS system name (such as a logical name or IP address) to identify information associated with a destination domain that might be private.

At a step 562, S-CSCF 520 of local IMS domain 510 acts as a P/I-CSCF by querying the remote HSS 522 for information relating to target S-CSCF 524 and remote IMS domain 512. At a step 564, remote HSS 522 replies to the query with information describing the target S-CSCF 524. At a step 566, local S-CSCF 520 performs service control, and the subscriber is activated on local IMS domain services.

At a step 568, local S-CSCF 520 sends a SIP "200 OK" message to P/I-CSCF 516 indicating a successful connection to local IMS services. Of course if a different protocol were being used besides SIP, an analogous message could be sent according to the specific protocol employed. At a step 570, the message at the previous step is forwarded on to the IMS client on the local device via mobile network 514.

To facilitate cascading IMS login, local S-CSCF 520 sends a registered message to remote IMS domain 512 on behalf of a mobile device. The register message contains the private user identity IMS system that was supplied to local S-CSCF in step 560 in one embodiment. At a step 574, remote S-CSCF 524 communicates a Cx-put message to remote HSS 522 to gather subscriber-specific information. S-CSCF 524 does not need to request cascading IMS information in one embodiment.

At a step 576, remote HSS 522 replies with the requested subscriber-session information. At a step 578, an 'OK" message is sent by remote S-CSCF 524 to local S-CSCF 520 to facilitate IMS registration on remote IMS domain 510. At a step 580, remote S-CSCF 524 performs remote service control, and the subscriber is activated on remote IMS domain 512, making its services available to a mobile device.

The call-flow steps illustrated in FIG. 5 are not to be construed as exact steps, each of which that need to be performed and/or in a specific order, but is meant to illustrate one example of effecting simultaneous reachability of IMS services between multiple domains by a wireless subscriber according to an embodiment of the present invention. As mentioned, if different protocols are employed, then different types of messages will be sent, but the overarching act of automatically registering with a remote IMS on behalf of a mobile device will be carried out.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-useable instructions embodied thereon for facilitating a method of accessing network resources, the method comprising:
   receiving login information associated with logging a customer into a first data network, utilizing a home subscriber server (HSS), associated with a home domain substantially owned by a first entity;
   utilizing the login information, automatically registering the customer with a plurality of second data networks associated with a plurality of foreign domains so that at least a portion of services that would have been available to a customer who was properly logged into each of second data networks in the plurality of second data networks will be available to the customer by virtue of the registering, wherein the automatically registering comprises: providing login information to a first serving call session control function (S-CSCF) in the home domain, and utilizing the login information to communicate login details to a second S-CSCF within each of the second data networks;
   communicating the login information from the HSS of the home domain to a third S-CSCF associated with a second foreign domain, wherein the first S-CSCF acts as a proxy or interrogating call session control function (P-CSCF or I-CSCF) to communicate the login information to the third S-CSCF; and
   logging in to the second foreign domain via the third S-CSCF to interface with the second foreign domain, such that at least a second portion of the set of services may be provided to the user by the second foreign domain.

2. The media of claim 1, wherein the first data network includes a mobile-communications-network capable of facilitating wireless voice calls.

3. The media of claim 2, where the plurality of second data networks include a cable network capable of communicating cable-television programming.

4. The media of claim 1, wherein each of the foreign domains in the plurality of foreign domains is substantially owned by another entity.

5. The media of claim 1, wherein the registering includes logging the customer into each of the second data networks in the plurality of second data networks.

6. A method of providing access to network resources in an IP Multimedia Subsystem (IMS) networking environment, the method comprising:
   receiving by way of a first network a request from a mobile device of a desire to access a set of services, the first network being a home or foreign network to the mobile device;
   determining that in order to satisfy the request, at least a portion of the services will need to be provided by a third network owned by a third entity, wherein the third network is a foreign network to the mobile device;
   utilizing login credentials associated with a first serving call session control function (S-CSCF) of the first network to automatically replicate a login process to a second S-CSCF associated with a second network so that a set of services is provided to the mobile device by the second network via the first network without user intervention; and
   automatically replicating, via the second network, a login process associated with a third S-CSCF of the third network using the login credentials so that the at least a portion of the services is provided by the third network via the second and first networks, wherein the first network controls the services provided by the second network and the third network.

7. The method of claim 6, wherein the first, second and third networks are substantially owned by different entities.

8. The method of claim 6, wherein the first network includes the ability to facilitate mobile wireless communications.

9. The method of claim 8, wherein the mobile wireless communications include communications between mobile phones.

10. The method of claim 8, wherein the second or third network includes the ability to communicate cable-television programming.

11. The method of claim 6, wherein utilizing login credentials associated with the first network to automatically replicate a login process associated with the second network further comprises:
   registering the mobile device with the second network as though the mobile device had originally accessed the second network directly.

12. The method of claim 6, further comprising automatically providing the at least a portion of the services to the mobile device.

13. The method of claim 6, further comprising repeating all or a portion of the steps recited in claim 6 to facilitate a cascading log-in process for additional networking environments.

14. One or more non-transitory computer-storage media having computer-useable instructions embodied thereon for performing a method of allowing resources associated with a foreign network to be provided to a customer via a home network, the method comprising:
   providing access to a home network that includes at least in part an IP Multimedia Subsystem (IMS) architecture;
   receiving via the home network an indication from a user that the user wishes to access at least a portion of a set of services, the at least a portion of the set of services being provided by a first foreign network which also includes at least in part an IP Multimedia Subsystem (IMS) architecture;
   utilizing a home subscriber server (HSS) associated with the home network to determine identifying information associated with the user;
   providing login information from the identifying information to a first serving call session control function (S-CSCF) associated with the home network;
   communicating the login information from the HSS of the home network to a second S-CSCF associated with the first foreign network, wherein the first S-CSCF acts as a proxy or interrogating call session control function (P-CSCF or I-CSCF) to communicate the login information to the second S-CSCF;
   logging in to the first foreign network via the second S-CSCF to interface with the first foreign network such that the at least a portion of the set of services may be provided to the user by the first foreign network;
   communicating the login information from the HSS of the home network to a third S-CSCF associated with a second foreign network, wherein the first S-CSCF acts as a proxy or interrogating call session control function (P-CSCF or I-CSCF) to communicate the login information to the third S-CSCF;

logging in to the second foreign network via the third S-CSCF to interface with the second foreign network such that at least a second portion of the set of services may be provided to the user by the second foreign network; and providing the set of services to the user, wherein the services of the home network, first foreign network, and second foreign network are simultaneously reachable.

15. The media of claim 14, further comprising:

the second S-CSCF communicating the login information provided by the HSS of the home network to a fourth S-CSCF associated with a third foreign network, wherein the second S-CSCF acts as a proxy or interrogating call session control function (P-CSCF or I-CSCF) to communicate the login information to the third S-CSCF;

logging in to the third foreign network via the fourth S-CSCF to interface with the third foreign network such that at least a third portion of the set of services may be provided to the user by the fourth foreign network via the first foreign network and the home network; and providing the set of services to the user, wherein the services of both the home network, the first foreign network, and the fourth foreign network are simultaneously reachable.

* * * * *